Jan. 1, 1924
E. A. COMMISKEY
TENSION DEVICE FOR VEHICLE STEERING MECHANISM
Filed April 29, 1921
1,479,457
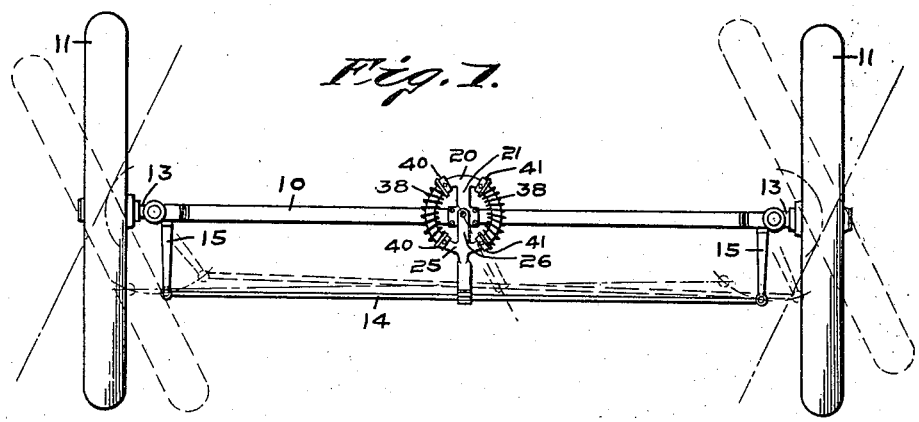
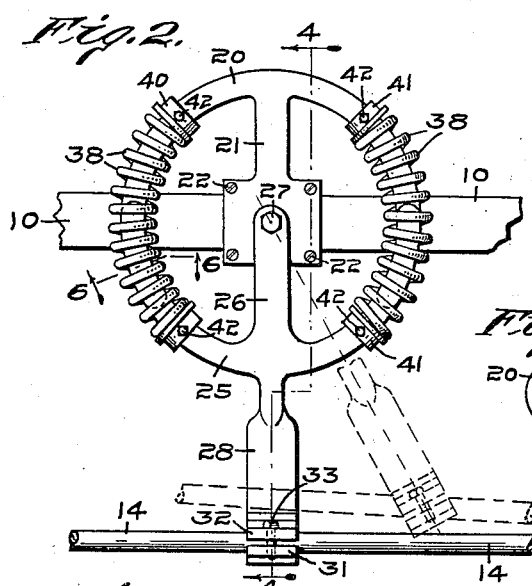
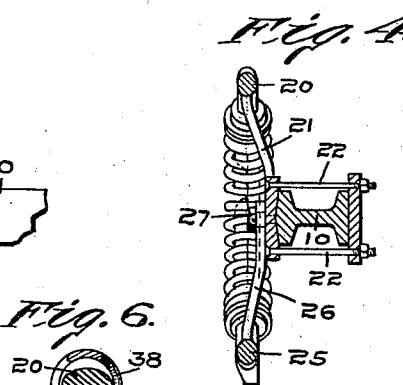
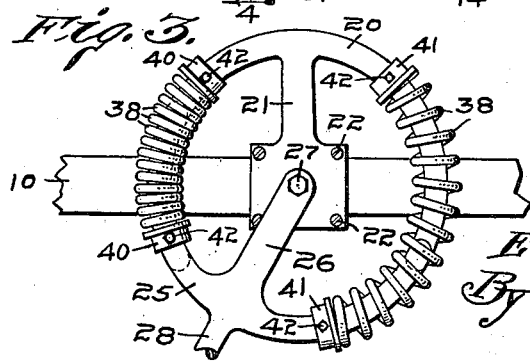
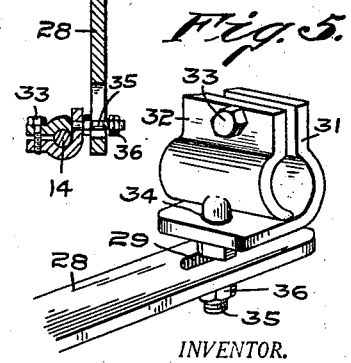
INVENTOR.
Edward A. Commiskey,
By Frank W. Soerner
ATTORNEY.

Patented Jan. 1, 1924.

1,479,457

UNITED STATES PATENT OFFICE.

EDWARD A. COMMISKEY, OF INDIANAPOLIS, INDIANA.

TENSION DEVICE FOR VEHICLE STEERING MECHANISM.

Application filed April 29, 1921. Serial No. 465,533.

*To all whom it may concern:*

Be it known that I, EDWARD A. COMMISKEY, a citizen of the United States, residing at Indianapolis, in county of Marion and State of Indiana, have invented certain new and useful Improvements in Tension Devices for Vehicle Steering Mechanism, of which the following is a specification.

This invention relates to an attachment for vehicle steering mechanisms; and one of the objects of the present invention consists in the provision of certain means for improving the steering qualities of vehicles, especially motor vehicles, by the application of a tension to so stabilize this class of steering mechanisms that the latter will not be too sensitive in yielding to lateral stresses when the vehicle wheels are passing over uneven surfaces or contact minor obstructions in the roadway, thereby relieving the driver of undue strain incident to the steering of such vehicles in which the steering mechanisms are free from any restraint.

A further object of the invention consists in the provision of means for applying a tension to the steering mechanisms of vehicles which is not only capable of reducing and absorbing shocks on the steering wheels without affecting the free manipulation of the steering mechanisms, but is capable of automatically restoring the steering mechanisms to neutral position.

A still further object of the invention consists in the provision of means for imposing a tension on steering mechanisms of motor vehicles, which is simple in construction, easy to install, efficient in operation, and is economical to manufacture.

I accomplish the above objects of the invention, and such others as may appear from a perusal of the following description and claims, by means of the construction illustrated in the accompanying drawings, forming a part hereof, in which—

Figure 1 is a plan view of a motor vehicle front axle, wheels, steering knuckles, and steering knuckle tie-rod with my invention in operative position. Fig. 2 is a detail plan view of my improved tension device for steering mechanisms, on a considerably enlarged scale. Fig. 3 is a detail plan view of the tension device, moved into a different position from that shown in Fig. 2. Fig. 4 is a longitudinal sectional view of the tension device, on the plane 4—4 in Fig. 2. Fig. 5 is a perspective view of the attaching means for connecting my invention to the steering knuckle tie-rod. Fig. 6 is a cross section, on the plane 6—6 in Fig. 2.

Referring to the drawings, 10 is a front axle as commonly employed in motor vehicle construction; 11 the wheels; 13 the steering knuckles, and 14 the steering knuckle tie-rod for connecting the levers 15 of the steering knuckles 13. To the intermediate portion of axle 10 I secure a segmental plate 20 provided with an arm 21 the free end of which is adapted to rest upon the upper surface of axle 10 and to which it is rigidly clamped by means of the bolts 22, in any suitable manner. The upper and flat surface of segmental plate 20 forms a path of travel upon which rides a movable segmental plate 25 having an integral arm 26 of sufficient length to extend past the center of the axis of the circle formed by the two plates 20 and 25, and movable segmental plate 25 is retained and guided in a defined circular path of travel upon the adjacent surface of segmental plate 20 by means of a king-bolt 27 which passes through the outer free end of arm 26, of plate 25, and into the enlarged end portion of arm 21, and the movable segmental plate 25 is further provided with an integral radially disposed rocker-arm 28, having a longitudinal slot 29 (Fig. 5) near its free end by which the segmental plate 25 may be loosely connected to the steering knuckle tie-rod 14. Tie-rod 14 is attached to segmental plate 25 by means of a pair of clamping plates 31 and 32 which are clamped to the sides of tie-rod 14 by means of a clamping bolt 33. As shown in Fig. 5, the clamping plate 31 is provided with an aperture 34 through which a threaded bolt 35 on the end of clamping plate 32 passes, so that the separation of the lower ends of the clamping plates 31 and 32 is prevented. Bolt 35 also extends through slot 29 in arm 28 of segmental plate 25, and by means of the clamping nuts 36 the parts are loosely connected together. This loose connection formed between the tension device and the tie-rod 14 provides the necessary accommodation for any variation in the relative position of the parts when the wheels 11 are swung on their pivots.

To automatically return the parts to normal position, from the position shown in dotted lines to the position shown in full lines in Fig. 1, I employ a pair of coil spring elements, 38, which are placed on opposite sides of the vertical axes of the segmental plates 20 and 25, and these springs are arranged so that the overlapped free ends of the circular arms of the plates 20 and 25 will project freely into the hollow cylinders formed by the convolutions of said spring elements 38. Each of the spring elements 38 is interposed between a pair of collars, 40, 40 and 41, 41. The collars of each pair are arranged so that one is secured to one of the free arms of segmental plate 20 and the other collar is secured to the companion arm of movable segmental plate 25. The collars 41 are arranged similarly to collars 40. These collars are adjustably attached to the circular supporting arms of the respective segmental plates 20 and 25 by means of the set screws 42 so that in the event the repelling force of one spring 38 is less than that of the other one or both of the collars confining the weaker spring may be adjusted towards each other to effect a further compression of the spring and thus increase its power of resistance to equalize the resistance imposed upon the steering mechanism by its companion spring element 38.

By means of the foregoing described tension device, it will be observed that I am able to impose a uniform opposed resilient tension for maintaining the steering mechanism of a vehicle in normal position, and if for any cause the steering mechanism is momentarily moved out of normal position, as when the steering wheels accidentally meet an obstruction, or when the driver turns a corner, said mechanism will be automatically returned to normal through the influence of the spring elements 38. While my tension device imposes a stress upon the steering mechanism, sufficient flexibility or resiliency remains as to not interfere with the free manipulation of the steering mechanism.

Having thus fully described my said invention, what I claim as new and desire to secure by Letters Patent, is—

1. In a device of the character described, an axle, a tie-rod, a segmental plate rigidly mounted on the axle, a second segmental plate concentric with the first and movable with the tie-rod said segmental plates having a portion of their periphery overlapping each other in sliding relation and a spring coiled about the overlapped portions to resist relative movement between the said segmental plates, substantially as set forth.

2. In a device of the character described, an axle, a tie-rod, a segmental plate rigidly mounted on the axle, a second segmental plate concentric with the first and movable with the tie-rod said segmental plates having a portion of their periphery overlapping each other in sliding relation, a spring having one end adjustably fixed to one of the segmental plates and the other end adjustably fixed to the other of said segmental plates the intermediate parts of said spring being coiled upon the said overlapped portions of the said segmental plates to resist relative movement between the said segmental plates, substantially as set forth.

In witness whereof, I, have hereunto set my hand and seal at Indianapolis, Indiana, this 26th day of April, A. D., one thousand nine hundred and twenty-one.

EDWARD A. COMMISKEY. [L. S.]